(12) United States Patent
Groves (10) Patent No.: US 11,246,264 B2
(45) Date of Patent: Feb. 15, 2022

(54) HARVESTING CONTROL SYSTEM WITH CUTTER BAR LOAD SENSING

(71) Applicant: Deere & Company, Moline, IL (US)

(72) Inventor: Riley C. Groves, East Moline, IL (US)

(73) Assignee: DEERE & COMPANY, Moline, IL (US)

(*) Notice: Subject to any disclaimer, the term of this patent is extended or adjusted under 35 U.S.C. 154(b) by 342 days.

(21) Appl. No.: 16/393,723

(22) Filed: Apr. 24, 2019

(65) Prior Publication Data
US 2020/0337233 A1 Oct. 29, 2020

(51) Int. Cl.
| A01D 41/127 | (2006.01) |
| A01D 34/04 | (2006.01) |
| A01D 34/14 | (2006.01) |
| A01D 34/30 | (2006.01) |
| A01F 12/28 | (2006.01) |
| A01D 61/00 | (2006.01) |
| A01F 12/44 | (2006.01) |

(52) U.S. Cl.
CPC ........... *A01D 41/127* (2013.01); *A01D 34/04* (2013.01); *A01D 34/145* (2013.01); *A01D 34/30* (2013.01); *A01D 61/008* (2013.01); *A01F 12/28* (2013.01); *A01F 12/444* (2013.01); *A01F 12/448* (2013.01)

(58) Field of Classification Search
CPC .... A01D 41/127; A01D 34/04; A01D 34/145; A01D 34/30; A01D 61/008; A01D 41/141; A01D 41/1278; A01F 12/28; A01F 12/444; A01F 12/448
See application file for complete search history.

(56) References Cited

U.S. PATENT DOCUMENTS

| 4,342,186 | A | * | 8/1982 | Stikeleather | A01D 34/30 56/257 |
| 4,735,036 | A | * | 4/1988 | Alexander | A01D 34/305 56/12.6 |
| 6,192,664 | B1 | | 2/2001 | Missotten et al. | |
| 7,874,132 | B2 | * | 1/2011 | Sauerwein | A01D 41/141 56/10.2 E |
| 7,921,626 | B2 | | 4/2011 | Maertens et al. | |
| 9,402,343 | B1 | * | 8/2016 | Allochis | A01D 41/14 |
| 9,668,406 | B2 | | 6/2017 | Dybro | |
| 9,706,709 | B2 | | 7/2017 | Cracraft et al. | |
| 2004/0144075 | A1 | * | 7/2004 | Jackson | A01D 34/13 56/257 |

(Continued)

*Primary Examiner* — Arpad Fabian-Kovacs
(74) *Attorney, Agent, or Firm* — Klintworth & Rozenblat IP LLP (57) ABSTRACT

A harvesting machine includes a chassis; an engine to propel the harvesting machine; a header mounted on a front of the chassis; a cutter bar arranged on the header to cut crops during operation of the harvesting machine; a plurality of implements on the chassis configured to facilitate processing the crops cut by the cutter bar; at least one cutter bar load sensor arranged on the header and configured to collect cutter bar load data representing a load on the cutter bar resulting from cutting the crops; and a controller operatively coupled to the at least one cutter bar sensor. The controller is configured to receive the cutter bar load data, determine a cutter bar load value based on the cutter bar load data, and generate an adjustment command for an operational parameter associated with at least one of the implements based on the cutter bar load value.

20 Claims, 7 Drawing Sheets

(56) References Cited

U.S. PATENT DOCUMENTS

| | | | |
|---|---|---|---|
| 2014/0245712 A1* | 9/2014 | Roberge | A01D 34/664 |
| | | | 56/10.2 A |
| 2017/0000030 A1* | 1/2017 | Soldan | A01D 41/142 |
| 2017/0127609 A1* | 5/2017 | Dunn | A01D 34/30 |
| 2017/0127611 A1* | 5/2017 | Dunn | A01D 34/38 |
| 2018/0153101 A1* | 6/2018 | Dunn | A01B 63/008 |
| 2018/0153102 A1* | 6/2018 | Dunn | A01D 41/127 |
| 2018/0199508 A1 | 7/2018 | Mueller et al. | |
| 2019/0053427 A1* | 2/2019 | Matway | A01D 45/10 |
| 2019/0183048 A1* | 6/2019 | Flintoft | A01D 41/141 |
| 2020/0100428 A1* | 4/2020 | Anderson | A01D 41/14 |
| 2020/0375099 A1* | 12/2020 | Andersen | F16F 9/04 |
| 2021/0144917 A1* | 5/2021 | Gurke | G01L 5/00 |

\* cited by examiner

HARVESTING CONTROL SYSTEM WITH CUTTER BAR LOAD SENSING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to agricultural harvesting machines, such as combine harvesters, and more specifically to systems for improving harvesting operations.

BACKGROUND OF THE DISCLOSURE

Agricultural harvesting machines include headers designed to cut and collect crops from the ground. In a combine harvester, the harvesting machine threshes the crops, separates the grain from other material, cleans the grain, stores the grain in a grain tank, and eventually, transfers the grain from the grain tank to an accompanying vehicle such as a grain cart or grain wagon. In a forage harvester, the crop is cut, accelerated, and blown into a container of a transport vehicle; and in a windrower, the crop is cut and deposited on a field in a swath. The operation of the harvesting machine is relatively complex, and a number of systems with parameters may be adjusted or modified, typically by the operator, to improve performance, although monitoring and implementing these operational parameter adjustments may be challenging.

SUMMARY OF THE DISCLOSURE

The disclosure provides a harvesting control system and method for monitoring cutter bar load values and controlling harvesting operational parameters of a harvesting machine based on the cutter bar load values.

In one aspect, the disclosure provides a harvesting machine with a chassis; an engine mounted on the chassis to propel the harvesting machine; a header mounted on a front of the chassis; a cutter bar arranged on the header and configured to cut crops during operation of the harvesting machine; a plurality of implements on the chassis configured to facilitate processing the crops cut by the cutter bar; at least one cutter bar load sensor arranged on the header and configured to collect cutter bar load data representing a load on the cutter bar resulting from cutting the crops; and a controller operatively coupled to the at least one cutter bar sensor. The controller is configured to receive the cutter bar load data, determine a cutter bar load value based on the cutter bar load data, and generate an adjustment command for an operational parameter associated with at least one of the implements based on the cutter bar load value.

In another aspect, the disclosure provides a harvester control system for a harvesting machine configured to cut crops with a cutter bar arranged on a header and a plurality of implements associated with processing the cut crop. The harvester control system includes at least one cutter bar load sensor arranged on the header and configured to collect cutter bar load data representing a load on the cutter bar resulting from cutting the crops. The harvester control system further includes a controller operatively coupled to the at least one cutter bar sensor. The controller configured to receive the cutter bar load data, determine a cutter bar load value based on the cutter bar load data, and generate an adjustment command for at least one of the implements based on the cutter bar load value.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example implementations of the disclosed harvesting control system and method, as shown in the accompanying figures of the drawings described briefly above. Various modifications to the example implementations may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

The present disclosure provides an improved harvesting control system for use in agricultural combine harvesters and other harvesting machines to enhance harvester operation and enhance crop collection. The harvester control system disclosed herein may be understood to collect and monitor loads on the cutter bar as the crop is being cut, as well as to actively control various operational parameters of the combine harvester based on the cutter bar load values. Through the improved system and method disclosed herein, the machine operational parameters may be continuously set and adjusted to enhance crop collection.

In various embodiments, the control system collects and monitors the cutter bar load values using one or more cutter bar load sensors. The cutter bar load values are evaluated and used to modify various operational parameters, including parameters associated with a number of harvester elements, including the engine, header, feederhouse, concaves, fan, sieve, chaffer, tailings elevator, residue subsystem, and other harvester elements.

Figure 1:
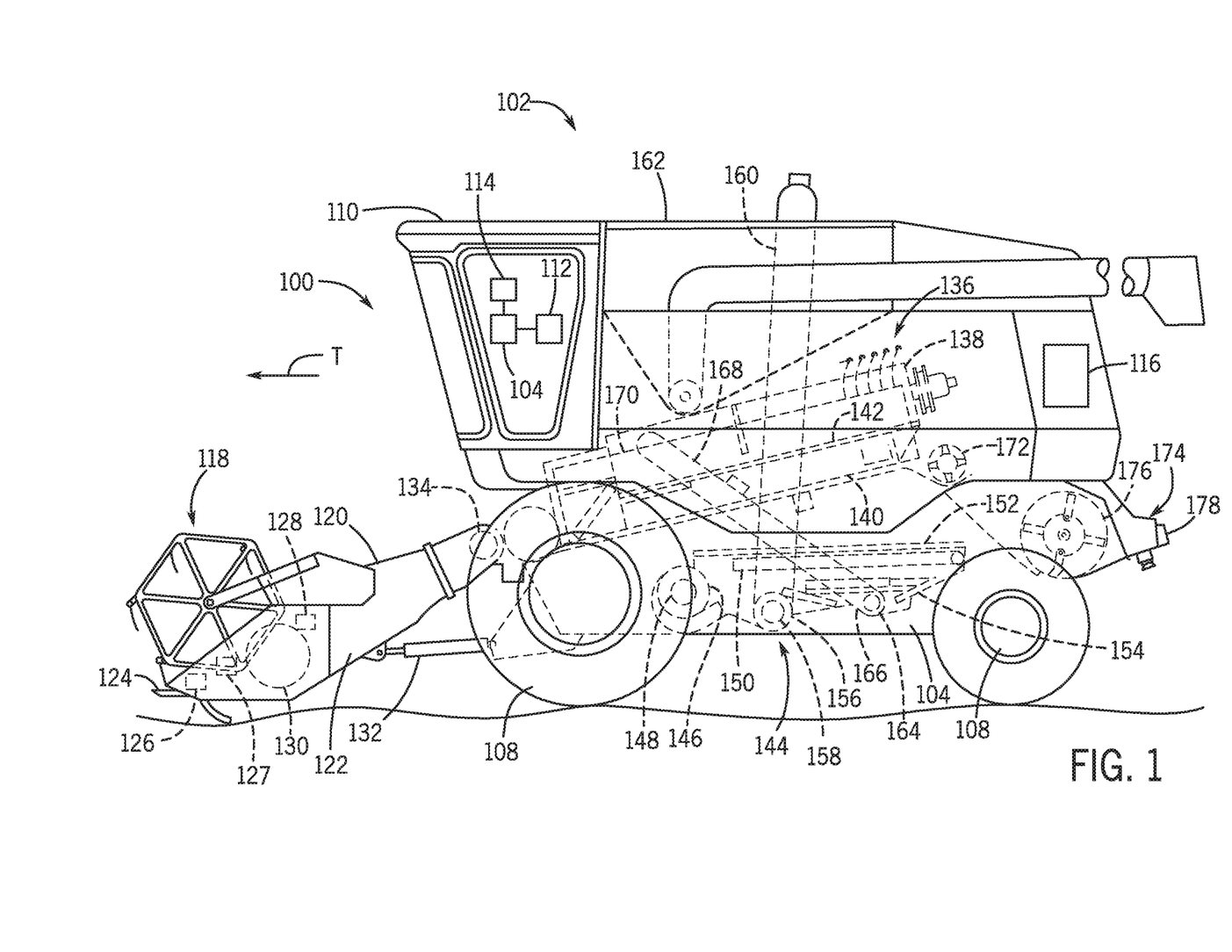
FIG. 1 is a schematic elevation view of a harvesting machine in the form of an example agricultural combine harvester that includes a harvesting control system according to this disclosure.
Figure 2:
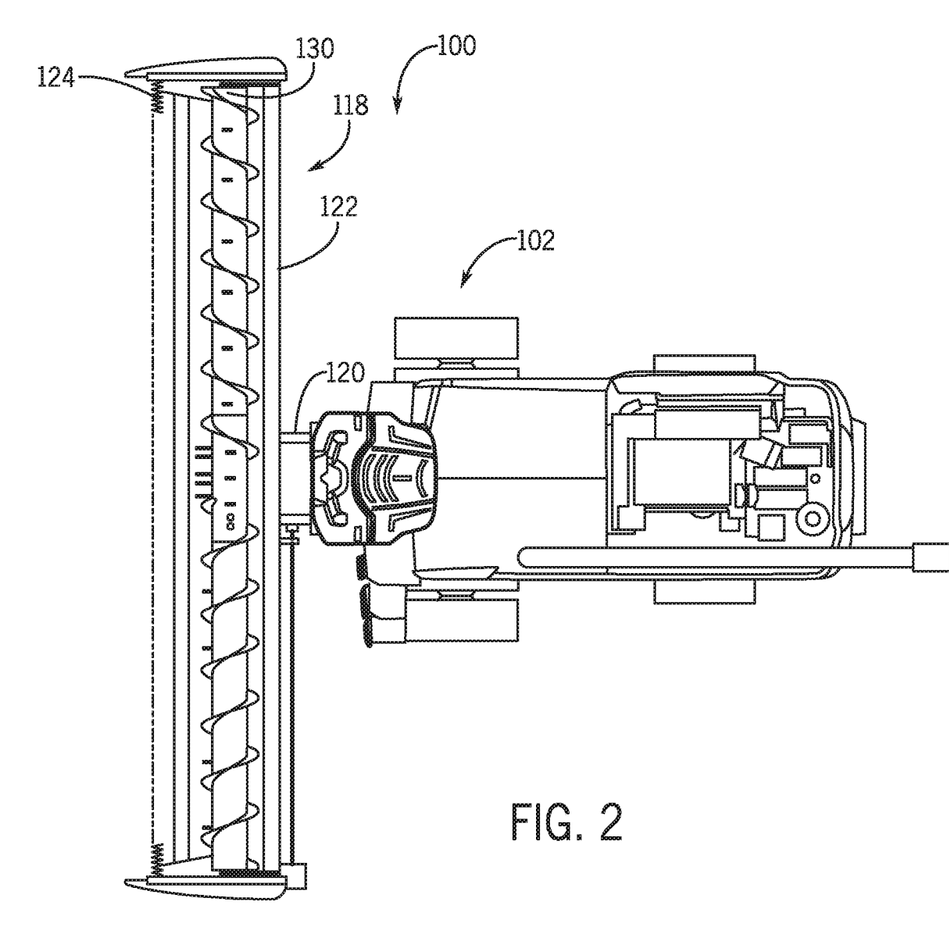
FIG. 2 is a schematic plan view of the example harvester of FIG. 1 according to this disclosure.

Referring now to FIGS. 1 and 2, a harvesting control system 100 may be implemented with an example agricultural combine harvester 102 or with respect to a variety of other agricultural harvesting machines (e.g., forage harvesters or windrowers). As described in greater detail below, the harvesting control system 100 is at least partially embodied with a controller 104 that controls and/or facilitates operation of various aspects of the harvester 102.

As shown, the example combine harvester 102 includes a chassis 106 with ground-engaging wheels 108 or tracks. The wheels 108 are rotatably mounted to the chassis 106 and engage with the ground to propel the combine harvester 102 in a travel direction T. An operator cab 110, also mounted to the chassis 106, houses an operator as well as various devices to control the harvester 102, such as one or more operator input devices 112 and/or display devices 114, described below.

The wheels 108 and other devices of the harvester 102 are powered by an internal combustion engine 116 or other power source. As described in greater detail below, the engine 116 may be operated based on commands from the operator and/or the controller 104, including in some examples, to implement aspects of the harvesting control system 100.

A header 118 is mounted at the front of the chassis 106 of the combine harvester 102 to cut and gather crop material from a field. The header 118 is supported by a feederhouse 120 pivotally mounted to the chassis 106. As described below, the header 118 includes a frame 122 supporting a cutter bar 124 that extends substantially across the length of the header 118 and that functions to cut crops along the ground. As schematically shown in FIG. 1, the header 118 may include one or more cutter bar load sensors 126, 127, 128.

In one example, the cutter bar load sensors 126, 127, 128 may be mounted to or otherwise associated with the header 118 in order to collect data associated with the "load" on the cutter bar 124 as an indication of the force required to cut the crop. For example, a higher load measured by the cutter bar load sensors 126, 127, 128 indicates that the crop being cut by the cutter bar 124 is thicker, more dense, or otherwise more difficult to cut, while a lower load measured by the cutter bar load sensors 126, 127, 128 indicates that the crop being cut by the cutter bar 124 is thinner, less denser, or otherwise easier to cut. The cutter bar load sensors 126, 127, 128 provide the cutter bar load data to the controller 104 for use in harvesting control system 100, as described in greater detail below. Additional information regarding the cutter bar 124 is provided below, particularly with respect to determining and utilizing the cutter bar load values on the cutter bar 124.

The header 118 may further include a mechanism for collecting the cut material from the cutter bar 124. In this example, the header 118 includes an auger 130 to transport the cut crop material towards the center of the header 118. Other examples may include one or more conveyors.

The header 118 may include a header actuator 132 that functions to reposition the header 118 relative to the ground and/or in front and rearward directions. The header actuator 132, as well as further actuators associated with the header 118, may be operated based on commands from the operator and/or the controller 104, including in some examples, to implement aspects of the harvesting control system 100.

The feederhouse 120 may include, for example, an inclined conveyor (not shown) to transport cut crop material from the header 118 into the body of the combine harvester 102. The conveyor of the feederhouse 120, as well as any further actuators associated with the feederhouse 120 (e.g., for repositioning the feederhouse 120), may be operated based on commands from the operator and/or the controller 104, including in some examples, to implement aspects of the harvesting control system 100.

After passing over a guide drum or feed accelerator 134, the crop material from the feederhouse 120 reaches a generally fore-aft oriented threshing device or separator 136. Other embodiments may include laterally oriented or other threshing devices (not shown). In the embodiment depicted, the separator 136 includes a rotor 138 on which various threshing elements are mounted. The rotor 138 rotates above one or more grated or sieved threshing baskets or concaves 140, such that crop material passing between the rotor 138 and the concaves 140 is separated, at least in part, into grain and chaff (or other "material other than grain" (MOG)). The concaves 140 may be opened and/or closed with one or more concave actuators 142 (schematically shown). The concave actuators 142, as well as further actuators associated with the concaves 140, may be operated based on commands from the operator and/or the controller 104, including in some examples, to implement aspects of the harvesting control system 100. The MOG is carried rearward and released from between the rotor 138 and the concaves 140. Most of the grain (and some of the MOG) separated in the separator 136 falls downward through apertures in the concaves 140.

Grain and MOG passing through the concaves 140 fall (or are actively fed) into a cleaning subsystem (or cleaning shoe) 144 for further cleaning. The cleaning subsystem 144 includes a fan 146, driven by a motor 148, that generates generally rearward air flow, as well as a sieve 150 and a chaffer 152. The motor 148 (and thus, the fan 146) may be operated based on commands from the operator and/or the controller 104, including in some examples, to implement aspects of the harvesting control system 100. The sieve 150 and the chaffer 152 are suspended with respect to the chassis 106 by an actuation arrangement 154 that may include pivot arms and rocker arms mounted to disks (or other devices).

As the fan 146 blows air across and through the sieve 150 and the chaffer 152, the actuation arrangement 154 may cause reciprocating motion of the sieve 150 and the chaffer 152 (e.g., via movement of the rocker arms). The combination of this motion of the sieve 150 and the chaffer 152 with the air flow from the fan 146 generally causes the lighter chaff to be blown upward and rearward within the combine harvester 102, while the heavier grain falls through the sieve 150 and the chaffer 152 and accumulates in a clean grain trough 156 near the base of the combine harvester 102. The actuation arrangement 154 associated with the sieve 150 and/or chaffer 152 may be operated based on commands from the operator and/or the controller 104, including in some examples, to implement aspects of the harvesting control system 100.

A clean grain auger 158 disposed in the clean grain trough 156 carries the material to the one side of the combine harvester 102 and deposits the grain in the lower end of a clean grain elevator 160. The clean grain lifted by the clean grain elevator 160 is carried upward until it reaches the upper exit of the clean grain elevator 160. The clean grain is then released from the clean grain elevator 160 and falls into a grain tank 162.

Most of the grain entering the cleaning subsystem 144, however, is not carried rearward, but passes downward through the chaffer 152, then through the sieve 150. Of the material carried by air from the fan 146 to the rear of the sieve 150 and the chaffer 152, smaller MOG particles are blown out of the rear of the combine harvester 102. Larger MOG particles and grain are not blown off the rear of the combine harvester 102, but rather fall off the cleaning subsystem 144.

Heavier material carried to the rear of the chaffer 152 falls out of the combine harvester 102. Heavier material carried to the rear of the sieve 150 falls onto a pan and is then conveyed by gravity downward into a grain tailings trough 164 in the form of "tailings," typically a mixture of grain and MOG. A tailings auger 166 disposed in the tailings trough 164 carries the grain tailings to the opposite side of the combine harvester 102 and into a grain tailings elevator 168.

The tailings elevator 168 may be constructed in a similar or different manner as the clean grain elevator 160 using any of various known transport mechanisms (e.g., augers, flighted belts, and so on). The tailings elevator 168, as well as further actuators associated with the tailings elevator 168 (e.g., for adjusting the positioning and/or speed of the elevator 168), may be operated based on commands from the operator and/or the controller 104 including in some examples, to implement aspects of the harvesting control system 100.

The grain tailings elevator 168 communicates with the tailings auger 166 at an inlet opening of the grain tailings elevator 168 where grain tailings are received for transport for further processing. In one embodiment, sprockets may drive a chain, which in turn drives paddles in order to drive a conveying arrangement for the grain tailings elevator 168, although other examples may have different arrangements. At a top end of the tailings elevator 168, an outlet opening (or other offload location) 170 is provided (e.g., for return to the thresher).

In a passive tailings implementation, the grain tailings elevator 168 carries the grain tailings upward and deposits them on a forward end of the rotor 138 to be re-threshed and separated. The grain tailings are then received by a discharge beater 172 where the remaining kernels of grain are released. The now-separated MOG is released behind the combine harvester 102 to fall upon the ground in a windrow or are delivered to a residue subsystem 174 that can include a chopper 176 and a spreader 178 to be chopped by the chopper 176 and spread on the field by the spreader 178. Alternatively, in an active tailings implementation, the grain tailings elevator 168 may deliver the grain tailings upward to an additional threshing unit (not shown) that is separate from the separator 136 and where the grain tailings are further threshed before being delivered to the main crop flow at the front of the cleaning subsystem 144. The actuators associated with the residue subsystem 174 (e.g., the chopper 176, spreader 178, and/or other actuators for adjustable parameters), may be operated based on commands from the operator and/or the controller 104, including in some examples, to implement aspects of the harvesting control system 100.

In addition to the cutter bar load sensors 126, 127, 128, the harvester 102 may further include a number of sensors that facilitate operation, particularly with respect to the harvesting control system 100. Additional sensors may include one or more separator loss sensors, cleaning loss sensors, ground speed sensors, engine sensors, positioning sensors, rotor speed sensors, threshing gap sensors, grain yield sensors, threshing load sensors, clean grain quality sensors, straw quality sensors, header height sensors, feederhouse mass flow sensors, and the like. In particular examples, the sensors of the harvester 102 may include a number of feedback and/or position sensors that facilitate operation and control of the various actuators of the harvester 102.

As introduced above, the harvester 102 includes an operator input device 112 located in the cab 110 to enable the operator to interface with the controller 104, harvesting control system 100, and/or other systems, subsystems, elements, and implements of the harvester 102. The operator input device 112 includes one or more user interface mechanisms, including levers, joysticks, steering wheels, pedals, buttons, audio devices, haptic devices, and the like.

The harvester 102 further includes a display device 114 located in the cab 110 (or remotely) in communication with the controller 104 and configured to present information associated with the harvester 102 to the operator, including information associated with the harvesting control system 100, as discussed in greater detail below. The display device 114 may take any suitable form, including a flat screen display device, LEDs, gauges, and the like. In some examples, the operator input device 112 may be incorporated into the display device 114 in the form of input mechanisms displayed on the display, such as links, icons, or other user actuatable mechanisms implemented with touchscreens or other cooperating user input mechanisms.

As introduced above, the controller 104 particularly facilitates implementation of the harvesting control system 100 in which the cutter bar load is utilized to modify one or more operational parameters of the harvester 102. Although the controller 104 is depicted on the harvester 102, aspects may be located remotely and communicate with the harvester 102. Additional information regarding the harvesting control system 100 will be provided below with respect to FIG. 7.

More generally, the controller 104 is provided to control various operational aspects of the harvester 102, either as a dedicated controller 104 for the harvesting control system 100 and/or as a main controller 104 for the harvester 102. The controller 104 may receive inputs from a number of sources, including the operator via the operator input devices 112 and from various sensors, units, and systems onboard or remote from the harvester 102; and in response, the controller 104 generates one or more types of commands for implementation by the various systems of harvester 102.

Broadly, the controller 104 may be configured as a computing device with associated processor devices and memory architectures, as a hard-wired computing circuit (or circuits), as a programmable circuit, as a hydraulic, electrical or electro-hydraulic controller, or otherwise. As such, the controller 104 may be configured to execute various computational and control functionality with respect to the harvester 102 (or other machinery). In some embodiments, the controller 104 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 104 (or a portion thereof) may be configured as an assembly of hydraulic components (e.g., valves, flow lines, pistons and cylinders, and so on), such that control of various devices (e.g., pumps or motors) may be implemented with, and based upon, hydraulic, mechanical, or other signals and movements.

The controller 104 may be in electronic, hydraulic, mechanical, or other communication with various other systems or devices of the harvester 102 (or other machinery). For example, the controller 104 may be in electronic or hydraulic communication with various actuators, sensors, and other devices within (or outside of) the harvester 102, including various devices associated with pumps, control valves, and so on. The controller 104 may communicate with other systems or devices (including other controllers) in various known ways, including via a CAN bus (not shown) of the harvester 102, via wireless or hydraulic communication means, or otherwise. Reference is now made to FIGS. 3-6, which are partial isometric views of the header 118 with portions removed to better illustrate cooperating aspects of the harvesting control system 100. Primarily, one side of the header 118 is depicted in the views of FIGS. 3-6, although the other side of the header 118 may have a similar (or different) configuration.

As shown, the header 118 is supported by a frame 122 that is configured to be mounted to the chassis 106 of the harvester 102 via a mounting arrangement 190. The frame 122 generally extends in a transverse or lateral direction relative to the direction of travel and supports the various elements of the header 118, including the cutter bar 124 arranged on the front end of the frame.

Figure 3:
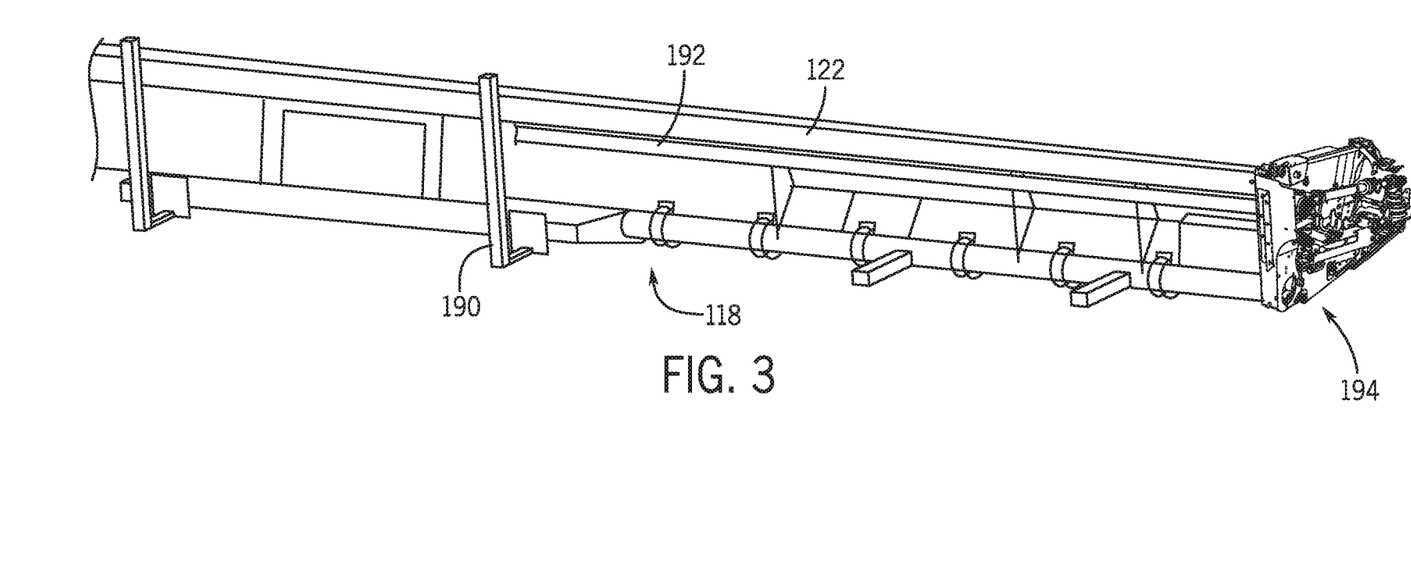
FIG. 3 is a first partial view of a header of the example harvester of FIG. 1 on which cutter bar load sensing is implemented with the harvesting control system according to this disclosure.

As best shown in FIG. 3 that depicts a partial rear view of one side of the header 118, the main drive shaft 192 extends across at least a portion of the frame 122. Although not shown, a first end of the main drive shaft 192 may be coupled to a source of power from the harvester 102, such as a PTO shaft or auxiliary shaft that receives torque from the engine 116. The other end of the main drive shaft 192 is coupled to the cutter bar drive assembly 194.

Generally, the cutter bar drive assembly 194 receives torque from the drive shaft 192 and transfers the power to drive the cutter bar 124. Any suitable arrangement may be provided. In one example, the cutter bar 124 extends across the length of the frame 122 and each side of the cutter bar 124 is driven by a respective cutter bar drive assembly 194 positioned on the lateral ends of the header 118. As noted above, the cutter bar 124 cuts crop from a field, and the header 118 (e.g., as a conveyor and auger) feeds it to the feederhouse 120 which conveys said crop into the interior of the harvester 102 where the crop is threshed, separated and cleaned, as discussed above.

Figure 4:
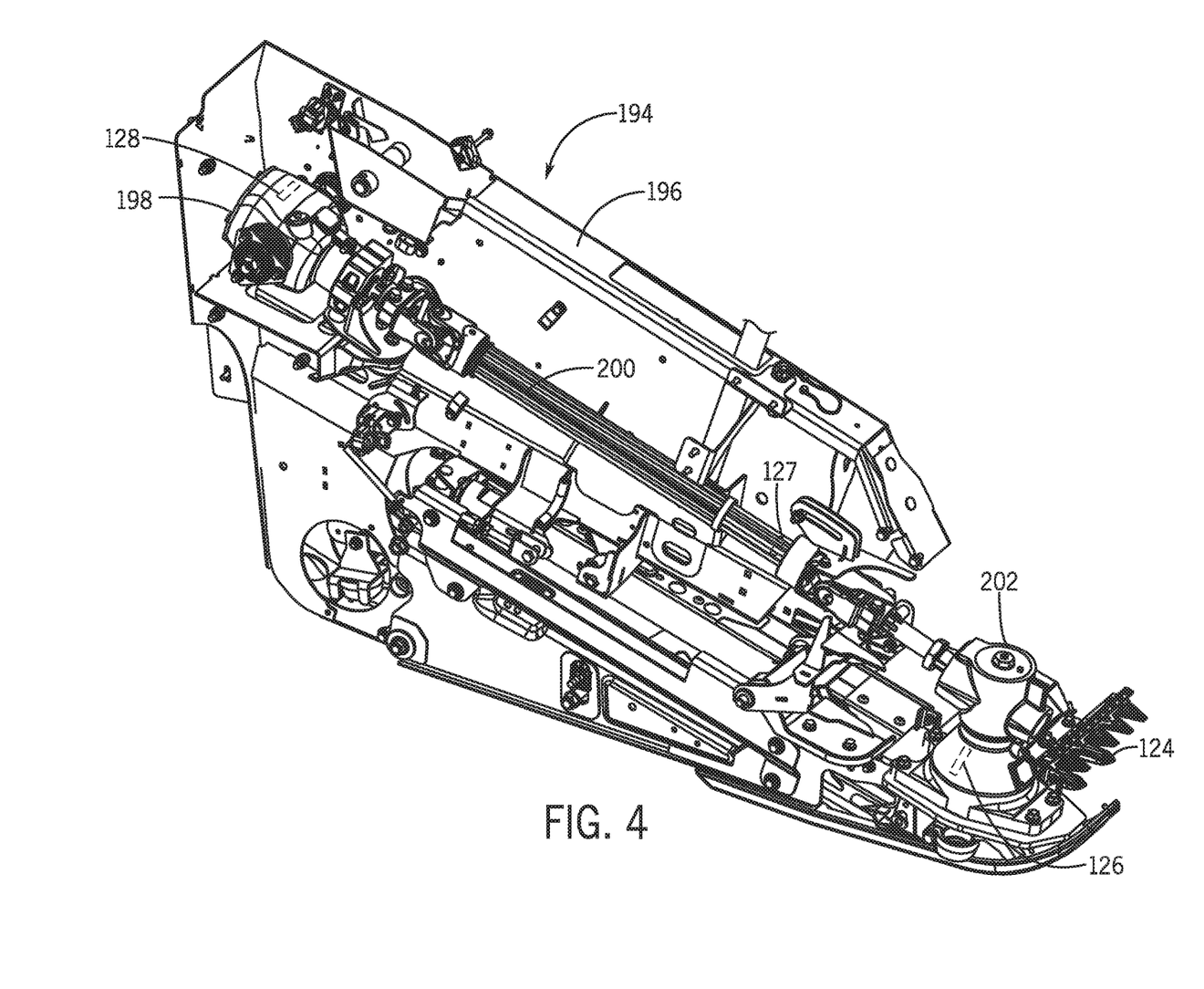
FIG. 4 is a second partial view of the header of the example harvester of FIG. 1 on which cutter bar load sensing is implemented with the harvesting control system according to this disclosure.
Figure 5:
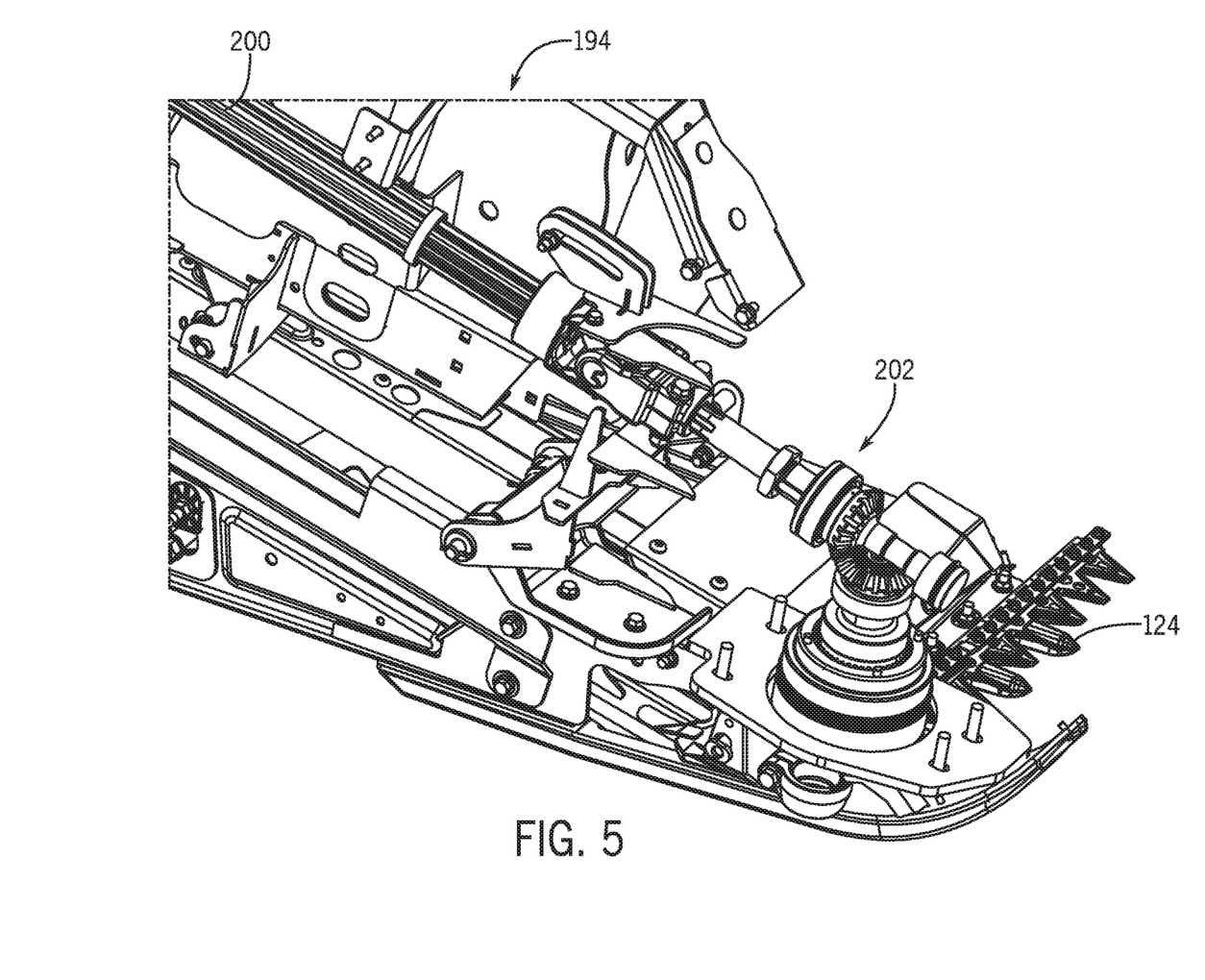
FIG. 5 is a third partial view of the header of the example harvester of FIG. 1 on which cutter bar load sensing is implemented with the harvesting control system according to this disclosure.
Figure 6:
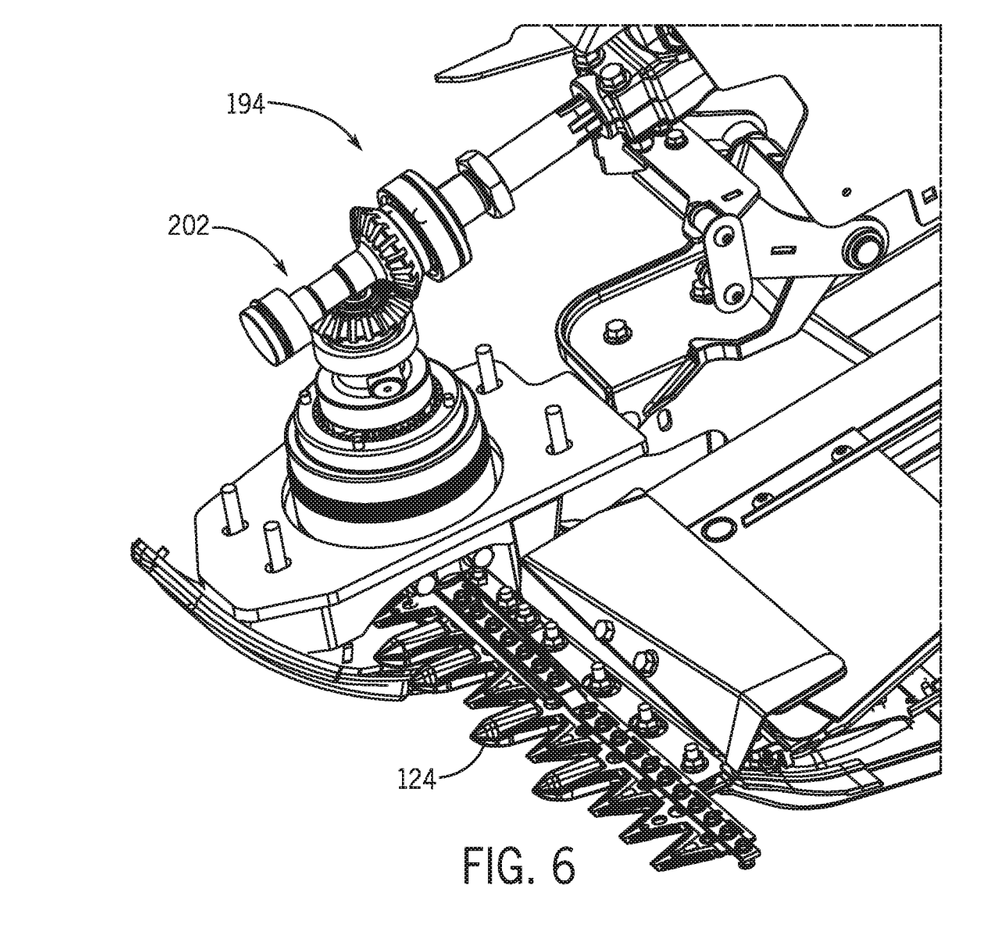
FIG. 6 is a fourth partial view of the header of the example harvester of FIG. 1 on which cutter bar load sensing is implemented with the harvesting control system according to this disclosure.

As best shown in FIGS. 4-6, the cutter bar drive assembly 194 includes a base plate 196 that supports various elements. In particular, the cutter bar drive assembly 194 includes a first gearbox 198 that operates to transfer power from the main drive shaft 192 in a lateral direction to a drive rod 200 in a longitudinal direction. The drive rod 200 extends in the longitudinal direction from the first gearbox 198 to the second gearbox 202.

As best shown in FIGS. 5 and 6 in which the housing of the second gearbox 202 has been removed, the second gearbox 202 functions to transfer power from the drive rod 200 to the cutter bar 124. In particular, the second gearbox 202 may include an eccentric drive wheel or other power transfer mechanism that enables the torque from the drive rod 200 to be transferred into a reciprocating linear movement of the cutter bar 124. Although arrangements may vary, in some examples, the cutter bar 124 may include knife elements and counter elements such that the second gearbox 202 drives the knife elements in a reciprocating manner to cut the crops against the counter elements. Subsequently, the crop material is transferred to from the header 118 into the feederhouse 120 and into the harvester 102 to be processed, as detailed above.

As introduced above and schematically depicted in FIG. 4, the cutter bar drive assembly 194 includes the one or more cutter bar load sensors 126, 127, 128 that function to collect data associated with the load being encountered by the cutter bar 124 upon cutting the crops. In one embodiment, the cutter bar load sensors 126, 127, 128 include a first cutter bar load sensor 126 associated with the second gearbox 202, a second cutter bar load sensor 127 associated with the drive rod 200, and a third cutter bar load sensor 128 associated with the first gearbox 198.

The first cutter bar load sensor 126 on the second gearbox 202 may be embodied as a pressure sensor on the second gearbox 202. In particular, the first cutter bar load sensor 126 may be internal to the second gearbox 202 to collect pressure information representative of the load being encountered by the cutter bar 124.

The second cutter bar load sensor 127 on the drive rod 200 may be embodied as a torque sensor and/or speed sensor on the drive rod 200. In particular, the second cutter bar load sensor 127 may be on the drive rod 200 to collect torque and/or speed information representative of the loading on the cutter bar 124 via the second gearbox 202.

The third cutter bar load sensor 128 on the first gearbox 198 may be embodied as a pressure sensor on the first gearbox 198. In particular, the third cutter bar load sensor 128 may be internal to the first gearbox 198 to collect pressure information representative of the load being encountered by the cutter bar 124 via the drive rod 200 and second gearbox 202.

Although three cutter bar load sensors 126, 127, 128 are depicted, one or more of the sensors 126, 127, 128 may be omitted. In some examples, data from the sensors 126, 127, 128 may be fused to provide enhanced load data and/or to improve confidence in the resulting load values. Further, in other examples, additional or alternative sensors may be provided. Generally, any sensor on the header 118 that collects data from which cutter bar load values can be derived may be utilized by the harvesting control system 100.

Figure 7:
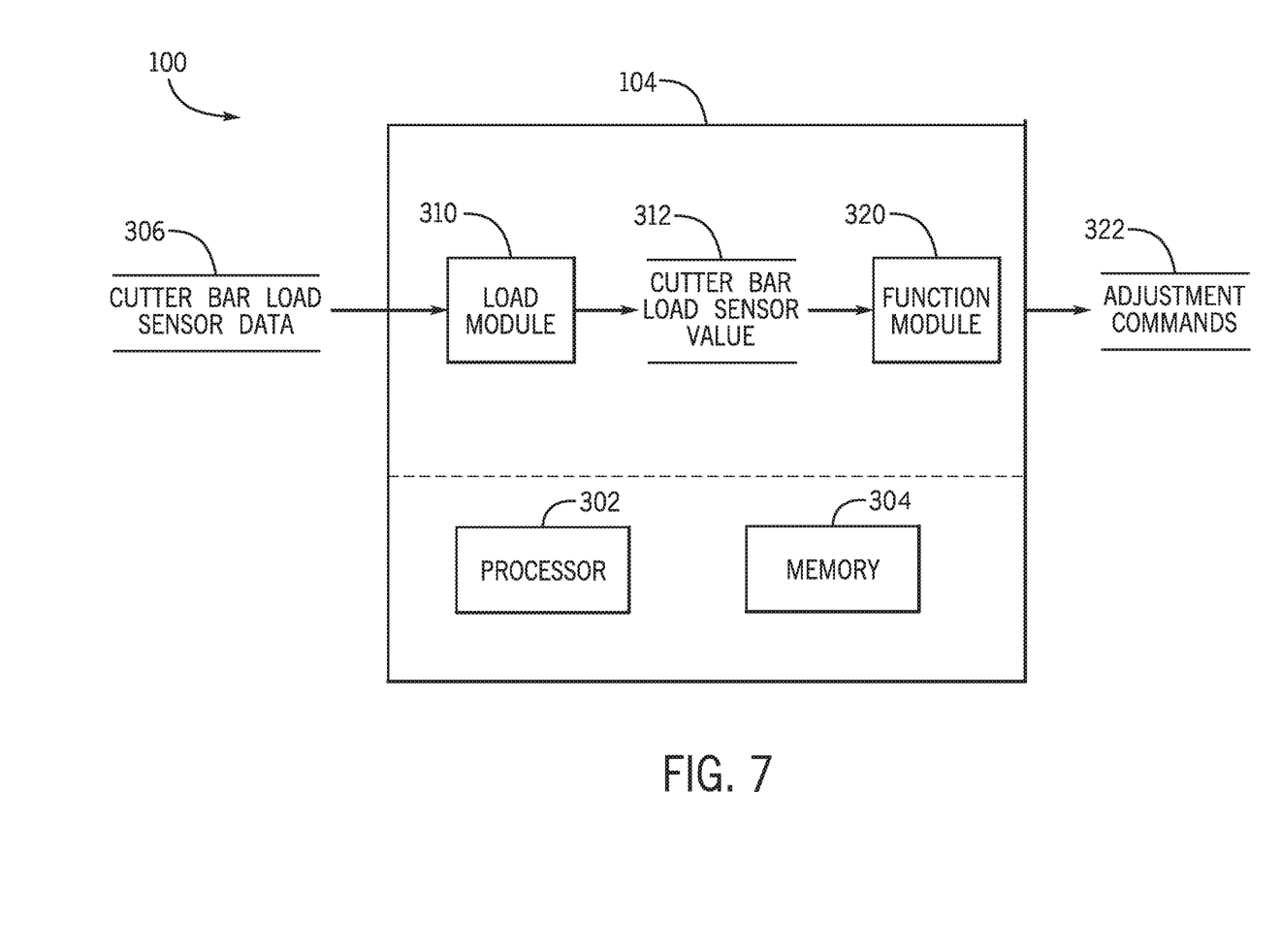
FIG. 7 is a schematic diagram of an example harvesting control system for controlling operational parameters of the harvester of FIG. 1 according to this disclosure.

Reference is now made to FIG. 7, which is a functional block dataflow diagram of portions of the harvesting control system 100 according to an embodiment. As noted above, the harvesting control system 100 may be considered to include the controller 104, one or more actuation devices of one or more systems or subsystems of the harvester 102 (e.g., engine 116, header 118, feederhouse 120, concaves 140, fan 146, sieve 150, chaffer 152, tailings elevator 168, residue subsystem 174, and other harvester elements), one or more sensors (e.g., sensors 126, 127, 128), and in some examples, the operator input devices 112 and display device 114.

With respect to the harvesting control system 100 of FIG. 7, the controller 104 may be organized as one or more functional units or modules 310, 320 (e.g., software, hardware, or combinations thereof). As can be appreciated, the modules 310, 320 shown in FIG. 7 may be combined and/or further partitioned to carry out similar functions to those described herein. As an example, each of the modules 310, 320 may be implemented with processing architecture such as a processor 302 and memory 304, as well as suitable communication interfaces. For example, the controller 104 may implement the modules 310, 320 with the processor 302 based on programs or instructions stored in memory 304. In this example, the controller 104 includes a load module 310 and a function module 320.

Operation of the harvesting control system 100 may be manually initiated by the operator, automatically upon initiating operation of the cutter bar 124, and/or automatically upon the determination that the load on the cutter bar 124 has reached a determined value (e.g., representing that the cutter bar 124 is cutting crops).

As shown, during operation, the controller 104 receives data 306 representing the load on the cutter bar 124. In particular, the load module 310 receives the cutter bar load data 306 from one or more of the cutter bar load sensors 126, 127, 128. The load module 310 receives the cutter bar load data and determines the value of the load on the cutter bar 124. In particular, depending on the nature of the cutter bar load data (e.g., pressure values, torque values, strain values, etc.), the load module 310 translates the data into corresponding cutter bar load value representing the load on the cutter bar 124. The load module 310 may perform various types of conditioning, smoothing, and/or filtering of the cutter bar load data in order to determine the cutter bar load value. The cutter bar load value 312 is provided to the function module 320. In some instances, the cutter bar load value 312 may be saved in the memory 304 and/or provided to the display device 114 for display to the operator.

The function module 320 receives and evaluates the cutter bar load value 312 for consideration with respect to operational parameters associated with the harvester 102. In particular, the function module 320 may evaluate the cutter bar load value 312 relative to various operational parameter thresholds saved in the memory 304 by comparing the cutter bar load value 312 to the operational parameter thresholds. Such operational parameter thresholds considered by the function module 320 may include, as examples, thresholds associated with the engine 116, header 118, feederhouse 120, concaves 140, fan 146, sieve 150, chaffer 152, tailings elevator 168, residue subsystem 174, and/or other harvester systems, subsystems, and components. The operational parameter thresholds may be the same or different for each operational parameter. Moreover, the operational parameter thresholds may be "maximum" thresholds (e.g., a threshold above which the associated operational parameter is adjusted) or "minimum" thresholds (e.g., a threshold below which the associated operational parameter is adjusted).

When the cutter bar load value 312 meets a respective operational parameter threshold, the function module 320 may initiate the adjustment or modification of the associated operational parameter. In particular, the function module 320 may access one or more adjustment algorithms, models, or tables stored in memory 304 that, for a respective cutter bar load value 312, provides a corresponding adjustment command 322 for the associated operational parameter. Such adjustment commands 322 may be iterative, proportional, absolute, and/or have any suitable relationship between the cutter bar load value 312 and a desired operational parameter represented by the adjustment command 322. In some embodiments, the operational parameter thresholds and corresponding adjustments considered by the function module 320 may be crop-specific such that the algorithms, models, and/or tables selected and utilized by the function module 320 are dependent on the type of crop being harvested. The type of crop may be selected by the operator (e.g., via the operator input device 112) and/or determined automatically (e.g., based on sensor readings). Further the adjustment commands 322 may be generated with respect to parameters in addition to (or in combination with) the cutter bar load value 312, such as ground speed, location, and the like.

As such, in response to the cutter bar load value 312, the function module 320 may generate an adjustment command 322 for one operational parameter associated with a harvester element or a number of adjustment commands 322 associated with operational parameters for numerous harvester elements. More specific examples are provided below.

In one example, the function module 320 provides the adjustment command 322 to the associated harvester element for automatic implementation. In some examples, the function module 320 provides a form of the adjustment command 322 as a suggested adjustment command display element for presentation to the operator via the display device 114. In response, the operator may manually make the suggested adjustment or approve the suggested adjustment for implementation by the harvesting control system 100.

As introduced above, the adjustment command 322 for a number of operational parameters may be generated based the cutter bar load value 312. For example, the function module 320 may issue adjustment commands 322 to any of the various actuator devices specified above to make adjustments to the crop processing components of the harvester 102 (e.g., the header components, threshing components, cleaning components, and so on). Examples are provided below.

In one embodiment, the adjustment command 322 may be generated for the header actuator 132 to reposition the header 118, such as raising or lowering the header 118. In one example, the harvesting control system 100 generates the adjustment command 322 for the header actuator 132 to raise the header 118 when the cutter bar load value 312 is relatively high and lower the header 118 when the cutter bar load value 312 is relatively low. Other adjustment procedures and sequences for the header 118 based on the cutter bar load value 312 may be provided.

In another embodiment, the adjustment command 322 may be generated for one or more actuators to reposition the feederhouse 120, such as raising or lowering the feederhouse 120 and/or increasing or decreasing the speed of the feederhouse conveyor. In one example, the harvesting control system 100 generates the adjustment command 322 to raise the feederhouse 120 and/or increase the speed of the feederhouse conveyor when the cutter bar load value 312 is relatively high, and lower the feederhouse 120 and/or decrease the speed of the feederhouse conveyor when the cutter bar load value 312 is relatively low. Other adjustment procedures and sequences for the feederhouse 120 based on the cutter bar load value 312 may be provided.

In another embodiment, the adjustment command 322 may be generated for the motor 148 to adjust the speed of the fan 146. In one example, the harvesting control system 100 generates the adjustment command 322 to include the speed of the fan 146 when the cutter bar load value 312 is relatively high to maintain material flow through the harvester 102 and decrease the speed of the fan 146 when the cutter bar load value 312 is relatively low. Other adjustment procedures and sequences for the fan 146 based on the cutter bar load value 312 may be provided.

In further embodiments, the adjustment command 322 may be generated for the actuation arrangement 154 of the sieve 150 and/or chaffer 152 to make adjustments to the sieve 150 and/or chaffer 152. In one example, the harvesting control system 100 generates the adjustment command 322 to increase the speed and/or extent of movement of the sieve 150 and/or chaffer 152 when the cutter bar load value 312 is relatively high and decrease the speed and/or extent of movement of the sieve 150 and/or chaffer 152 when the cutter bar load value 312 is relatively low. As another example, if the cutter bar load value 312 is relatively high, the adjustment command 322 may increase the opening of the chaffer 152 to reduce grain loss. Other adjustment procedures and sequences for the sieve 150 and/or chaffer 152 based on the cutter bar load value 312 may be provided.

In another embodiment, the adjustment command 322 may be generated for the tailings elevator 168 to adjust the speed of the tailings elevator 168. In one example, the harvesting control system 100 generates the adjustment command 322 to increase the speed of the tailings elevator 168 when the cutter bar load value 312 is relatively high and decrease the speed of the tailings elevator 168 when the cutter bar load value 312 is relatively low. Other adjustment procedures and sequences for the tailings elevator 168 based on the cutter bar load value 312 may be provided.

In a further embodiment, the adjustment command 322 may be generated for the concave actuators 142 to adjust the opening and closing of the concaves 140. In one example, the harvesting control system 100 generates the adjustment command 322 to increase the extent of the openings of the concaves 140 when the cutter bar load value 312 is relatively high and decrease the extent of the openings of the concaves 140 when the cutter bar load value 312 is relatively low. Other adjustment procedures and sequences for the concaves 140 based on the cutter bar load value 312 may be provided.

In another embodiment, the adjustment command 322 may be generated for the engine 116 to adjust the speed of the engine 116. In one example, the harvesting control system 100 generates the adjustment command 322 to increase the speed of the engine 116 when the cutter bar load value 312 is relatively high to enable increased power to drive the processing components (e.g., the threshing rotor 138, discharge beater 172, chopper 176, feederhouse 120, fan 146, and the like) and decrease the speed of the engine 116 when the cutter bar load value 312 is relatively low. Other adjustment procedures and sequences for the engine 116 based on the cutter bar load value 312 may be provided.

In another embodiment, the adjustment command 322 may be generated for the actuators associated with the residue subsystem 174 to adjust the parameters (e.g., speed or position) of the residue subsystem 174. Various adjustment procedures and sequences for the residue subsystem 174 based on the cutter bar load value 312 may be provided. As one example, when the cutter bar load value 312 is relatively high, the spreader 178 may be modified to increase the spread width to maintain or enhance the spread pattern behind the harvester 102.

Additionally, the cutter bar load value 312 and/or the adjustment commands 322 may be provided to additional systems onboard or remote from the harvester 102. For example, the cutter bar load value 312 and/or the adjustment commands 322 may be provided to a yield mapping system that enables comparison of the load values to calculated crop yield and machine learning for enhanced yield prediction.

In some embodiments, the display device 114 may display various information pertinent to the operator and to the operation of the combine harvester 102, such as the present load upon the cutter bar 124 and/or the suggested or implemented adjustments for the harvester 102. In one embodiment, the controller 104 outputs control signals that control and adjust the operational parameters of the combine harvester 102, as listed above.

Accordingly, the embodiments discussed herein provide a harvesting control system and/or method for controlling an operating parameter of an agricultural harvesting machine that improves operation of the harvester and/or crop collection results. In order to simplify operation, relieve the operator from continuously attempting to make adjustment evaluations based on insufficient data, and provide optimal results, the harvester is provided with a system for automatic (or suggested) adjustments of operational parameters of various elements, systems, or subsystems. The adjustments operate to maintain or enhance the collection and flow of crop material through the harvester. Although various example characteristics of the harvester are presented above, it will be appreciated that the combine harvester may include other elements or configurations and/or may be implemented in other types of harvesting machines.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

Also, the following examples are provided, which are numbered for convenient reference, as follows:

1. A harvesting machine, comprising: a chassis; an engine mounted on the chassis to propel the harvesting machine; a header mounted on a front of the chassis; a cutter bar arranged on the header and configured to cut crops during operation of the harvesting machine; a plurality of implements on the chassis configured to facilitate processing the crops cut by the cutter bar; at least one cutter bar load sensor arranged on the header and configured to collect cutter bar load data representing a load on the cutter bar resulting from cutting the crops; and a controller operatively coupled to the at least one cutter bar sensor, the controller configured to: receive the cutter bar load data, determine a cutter bar load value based on the cutter bar load data, and generate an adjustment command for an operational parameter associated with at least one of the implements based on the cutter bar load value.

2. The harvesting machine of claim 1, wherein the header comprises: a frame on which the cutter bar is mounted; a drive shaft supported by the frame; and a cutter bar drive assembly mounted on the frame and configured transfer power from the drive shaft to the cutter bar.

3. The harvesting machine of claim 2, wherein the at least one cutter bar load sensor is mounted on the cutter bar drive assembly.

4. The harvesting machine of claim 3, wherein the cutter bar drive assembly includes at least one gearbox, the at least one cutter bar load sensor being incorporated into the at least one gearbox.

5. The harvesting machine of claim 3, wherein the cutter bar drive assembly includes a first gearbox coupled to the drive shaft, a second gearbox coupled to the cutter bar, and a drive rod extending between the first gearbox and the second gearbox, the at least one cutter bar load sensor being arranged on the drive rod.

6. The harvesting machine of claim 3, wherein the cutter bar drive assembly includes a first gearbox coupled to the drive shaft, a second gearbox coupled to the cutter bar, and a drive rod extending between the first gearbox and the second gearbox, the at least one cutter bar load sensor being arranged on the first gearbox.

7. The harvesting machine of claim 3, wherein the cutter bar drive assembly includes a first gearbox coupled to the drive shaft, a second gearbox coupled to the cutter bar, and a drive rod extending between the first gearbox and the second gearbox, the at least one cutter bar load sensor being arranged on the second gearbox.

8. The harvesting machine of claim 3, wherein the plurality of implements includes a header actuator configured to reposition the header, and wherein the controller is configured to generate the adjustment command to reposition the header as the operational parameter based on the cutter bar load value.

9. The harvesting machine of claim 3, wherein the plurality of implements includes a feederhouse configured to collect the cut crop from the header, and wherein the controller is configured to generate the adjustment command to modify the operational parameter associated with the feederhouse based on the cutter bar load value.

10. The harvesting machine of claim 3, wherein the plurality of implements includes a fan configured to facilitate processing of the cut crop, and wherein the controller is configured to generate the adjustment command to modify the operational parameter associated with the fan based on the cutter bar load value.

11. The harvesting machine of claim 3, wherein the plurality of implements includes a sieve and a chaffer configured to facilitate processing of the cut crop, and wherein the controller is configured to generate the adjustment command to modify the operational parameter associated with at least one of the sieve and the chaffer based on the cutter bar load value.

12. The harvesting machine of claim 3, wherein the plurality of implements includes a tailings elevator configured to facilitate processing of the cut crop, and wherein the controller is configured to generate the adjustment command to modify the operational parameter associated with the tailings elevator based on the cutter bar load value.

13. The harvesting machine of claim 3, wherein the plurality of implements includes at least one concave configured to facilitate processing of the cut crop, and wherein the controller is configured to generate the adjustment command to modify the operational parameter associated with the at least one concave based on the cutter bar load value.

14. The harvesting machine of claim 3, wherein the controller is configured to generate the adjustment command to modify the operational parameter associated with the engine based on the cutter bar load value.

15. The harvesting machine of claim 3, wherein the plurality of implements includes a residue subsystem configured to facilitate processing of the cut crop, and wherein the controller is configured to generate the adjustment command to modify the operational parameter associated with the residue subsystem based on the cutter bar load value.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A harvesting machine, comprising:
a chassis;
a header mounted on a front of the chassis;
a cutter bar arranged on the header to cut crops during operation of the harvesting machine;
an implement mounted on the chassis to process the crops cut by the cutter bar, the implement selected from a feederhouse, a concave, a fan, a sieve, a chaffer, a tailings elevator and a residue subsystem of the harvesting machine, each processing the crops cut by the cutter bar downstream from the header;
a cutter bar load sensor arranged on the header to collect cutter bar load data representing a load on the cutter bar resulting from cutting the crops; and
a controller operatively coupled to the cutter bar load sensor, the controller:
receives the cutter bar load data,
determines a cutter bar load value based on the cutter bar load data, and
generates an adjustment command for an operational parameter associated with the implement based on the cutter bar load value.

2. The harvesting machine of claim 1, wherein the header comprises:
a frame on which the cutter bar is mounted;
a drive shaft supported by the frame; and
a cutter bar drive assembly mounted on the frame to transfer power from the drive shaft to the cutter bar.

3. The harvesting machine of claim 2, wherein the cutter bar load sensor is mounted on the cutter bar drive assembly.

4. The harvesting machine of claim 3, wherein the cutter bar drive assembly includes a gearbox, the cutter bar load sensor being incorporated into the gearbox.

5. The harvesting machine of claim 3, wherein the cutter bar drive assembly includes a first gearbox coupled to the drive shaft, a second gearbox coupled to the cutter bar, and a drive rod extending between the first gearbox and the second gearbox, the cutter bar load sensor being arranged on the drive rod.

6. The harvesting machine of claim 3, wherein the cutter bar drive assembly includes a first gearbox coupled to the drive shaft, a second gearbox coupled to the cutter bar, and a drive rod extending between the first gearbox and the second gearbox, the cutter bar load sensor being arranged on the first gearbox.

7. The harvesting machine of claim 3, wherein the cutter bar drive assembly includes a first gearbox coupled to the drive shaft, a second gearbox coupled to the cutter bar, and a drive rod extending between the first gearbox and the second gearbox, the cutter bar load sensor being arranged on the second gearbox.

8. The harvesting machine of claim 3, further including a header actuator to reposition the header, and
wherein the controller generates an adjustment command to reposition the header based on the cutter bar load value.

9. The harvesting machine of claim 3, wherein the controller generates the adjustment command to modify the operational parameter associated with the feederhouse based on the cutter bar load value.

10. The harvesting machine of claim 3, wherein the controller generates the adjustment command to modify the operational parameter associated with the fan based on the cutter bar load value.

11. The harvesting machine of claim 3, wherein the controller generates the adjustment command to modify the operational parameter associated with the sieve, the chaffer or both based on the cutter bar load value.

12. The harvesting machine of claim 3, wherein the controller generates the adjustment command to modify the operational parameter associated with the tailings elevator based on the cutter bar load value.

13. The harvesting machine of claim 3, wherein the controller generates the adjustment command to modify the operational parameter associated with the at least one concave based on the cutter bar load value.

14. The harvesting machine of claim 3, wherein the controller generates an adjustment command to modify an operational parameter associated with an engine based on the cutter bar load value.

15. The harvesting machine of claim 3, wherein the controller generates the adjustment command to modify the operational parameter associated with the residue subsystem based on the cutter bar load value.

16. A harvester control system for a harvesting machine to cut crops with a cutter bar arranged on a header and having implements associated with processing the cut crop, the implements selected from a feederhouse, a concave, a fan, a sieve, a chaffer, a tailings elevator and a residue subsystem, the harvester control system comprising:
    a cutter bar load sensor arranged on the header to collect cutter bar load data representing a load on the cutter bar resulting from cutting the crops; and
    a controller operatively coupled to the cutter load bar sensor, the controller:
    receives the cutter bar load data,
    determines a cutter bar load value based on the cutter bar load data, and
    generates an adjustment command for at least one of the implements based on the cutter bar load value.

17. The harvester control system of claim 16, wherein the at least one cutter bar load sensor is arranged on a cutter bar drive assembly of the header.

18. The harvester control system of claim 17, wherein the cutter bar load sensor is arranged on a gearbox of the cutter bar drive assembly of the header.

19. The harvester control system of claim 17, wherein the cutter bar load sensor is arranged on a drive rod of the cutter bar drive assembly of the header.

20. The harvester control system of claim 17, wherein the cutter bar load sensor is arranged on a gearbox of the cutter bar drive assembly and a second cutter bar load sensor is arranged on a drive rod of the cutter bar drive assembly.

* * * * *

UNITED STATES PATENT AND TRADEMARK OFFICE
CERTIFICATE OF CORRECTION

| | | |
|---|---|---|
| PATENT NO. | : 11,246,264 B2 | Page 1 of 1 |
| APPLICATION NO. | : 16/393723 | |
| DATED | : February 15, 2022 | |
| INVENTOR(S) | : Riley C. Groves | |

It is certified that error appears in the above-identified patent and that said Letters Patent is hereby corrected as shown below:

In the Claims

In Column 17, Claim 14, Line 21, delete "an adjustment" and insert -- the adjustment --, therefor.

In Column 18, Claim 17, Line 17, delete "at least one cutter" and insert -- cutter --, therefor.

Signed and Sealed this
Twenty-fourth Day of May, 2022

*Katherine Kelly Vidal*

Katherine Kelly Vidal
*Director of the United States Patent and Trademark Office*